(12) United States Patent
Van Der Werf et al.

(10) Patent No.: US 7,700,012 B2
(45) Date of Patent: Apr. 20, 2010

(54) PROCESS FOR THE PRODUCTION OF UREA-COMPRISING PARTICLES

(75) Inventors: Jan Wiebe J. W. Van Der Werf, Seleen (NL); Marc Jozeph M. J. Brouwer, Maastricht (NL)

(73) Assignee: DSM IP Assets B.V., Heerlen (NL)

( * ) Notice: Subject to any disclaimer, the term of this patent is extended or adjusted under 35 U.S.C. 154(b) by 188 days.

(21) Appl. No.: 11/918,233

(22) PCT Filed: Apr. 3, 2006

(86) PCT No.: PCT/EP2006/003450

§ 371 (c)(1),
(2), (4) Date: Oct. 11, 2007

(87) PCT Pub. No.: WO2006/111331

PCT Pub. Date: Oct. 26, 2006

(65) Prior Publication Data

US 2009/0084149 A1    Apr. 2, 2009

(30) Foreign Application Priority Data

Apr. 18, 2005   (EP) .................................. 05075927

(51) Int. Cl.
*B29B 9/10*   (2006.01)
*C05C 9/00*   (2006.01)

(52) U.S. Cl. ..................... 264/5; 71/28; 71/29; 71/30; 71/64.03; 71/64.13

(58) Field of Classification Search ...................... 71/28, 71/29, 30, 64.03, 64.13; 264/5
See application file for complete search history.

(56) References Cited

U.S. PATENT DOCUMENTS

| 2,118,439 | A | * | 5/1938 | Lawrence et al. | ............... | 71/28 |
| 2,830,036 | A | * | 4/1958 | O'Donnell | .................. | 525/509 |
| 3,100,698 | A | * | 8/1963 | Horsley et al. | ................. | 71/28 |
| 3,388,989 | A | | 6/1968 | Sor | | |
| 4,478,632 | A | * | 10/1984 | Van Hijfte et al. | ............. | 71/29 |
| 6,254,655 | B1 | | 7/2001 | Goertz | | |
| 7,498,055 | B2 | * | 3/2009 | Mutsers | ..................... | 427/213 |
| 2002/0045727 | A1 | | 4/2002 | Weyer et al. | | |

FOREIGN PATENT DOCUMENTS

DE          44 22 403        6/1995
WO     WO 03/011446 A1     2/2003

OTHER PUBLICATIONS

International Search Report mailed Jun. 2006 in PCT/EP2006/003450.

* cited by examiner

*Primary Examiner*—Wayne Langel
(74) *Attorney, Agent, or Firm*—Nixon & Vanderhye P.C.

(57) ABSTRACT

Process for the production of urea-comprising particles, wherein the urea-comprising particles are produced in a pelletizer, comprising a feeding device, a belt and a device to remove the formed pellets from the belt, by feeding a urea-comprising liquid to the feeding device from which droplets of the urea-comprising liquid are dosed to the belt, whereon the urea-comprising droplets solidify and cool to a temperature of $\leq 55°$ C., whereafter the formed urea-comprising particles are removed from the belt.

9 Claims, No Drawings

PROCESS FOR THE PRODUCTION OF UREA-COMPRISING PARTICLES

This application is the US national phase of international application PCT/EP2006/003450 filed 3 Apr. 2006 which designated the U.S. and claims benefit of EP 05075927.3, dated 18 Apr. 2005, the entire content of which is hereby incorporated by reference.

The invention is directed to a process for the production of urea-comprising particles.

Known and frequently used processes for the production of urea-comprising particles are prilling and granulation. Prilling is performed in a prilling tower wherein a urea-comprising liquid is sprayed in the form of fine droplets. On their way down these droplets are cooled and solidified by rising air. At the bottom of the prilling tower the solid particles are collected. Granulation of a urea-comprising liquid can take place in different types of granulation equipment. Seed particles are added to the granulation equipment and are kept moving within the granulation equipment. The urea-comprising liquid is sprayed over the seed particles and cooled. In this way the seed particles grow to obtain urea granules.

These processes are, for instance, described in Ullmann's Encyclopedia of Industrial Chemistry, 2002 in the chapters relating to Urea and Fertilizer Granulation.

A drawback of the above-described processes is that by spraying of the urea-comprising solution fine dust is formed that is collected into the cooling air. The large amount of cooling air used during prilling and granulation must be cleaned of most of the dust before it can be discharged into the environment.

For prilling and granulation the use of a lot of cooling air is required. This results in a high energy consumption. Moreover, prilling and granulation are environmentally unfriendly processes, because of the dust formation during these processes.

The aim of the present invention is to eliminate these drawbacks.

This aim is achieved with the process according to the present invention wherein the urea-comprising particles are produced in a pelletizer, comprising a feeding device, a belt and a device to remove the formed pellets from the belt, by feeding a urea-comprising liquid to the feeding device from which droplets of the urea-comprising liquid are dosed to the belt, whereon the urea-comprising droplets solidify and cool to a temperature of $\leq 55°$ C., whereafter the formed urea-comprising particles are removed from the belt.

In a pelletizer urea-comprising particles are formed without the need to spray fine droplets and without the use of cooling air that is in direct contact with the particles. In this way an air stream comprising urea dust is not formed.

A further advantage of the use of a pelletizer is that particles are obtained with a uniform, predetermined shape and composition.

A pelletizer comprises a feeding device, a belt and a device to remove the formed pellets from the belt. A pelletizer is, for instance, described as an endless-belt system in the Encyclopedia of Chemical Technology, Fourth Edition, vol. 22, p. 244 and 245.

The urea-comprising liquid is fed to the feeding device. The feeding device can, for instance, comprise a screen with holes through which the urea-comprising liquid is pressed. The feeding device is located above the belt and the urea-comprising liquid is dosed through the holes in the screen at the bottom of the feeding device. In this way droplets of urea-comprising liquid are formed on the belt. The feeding device can, for instance, be a perforated cylindrical drum, which rotates and which doses droplets to the belt at the bottom of the cylindrical drum. The belt can be a continuous belt that moves away from the feeding device with the urea-comprising droplets on it. The part of the belt after the feeding device is cooled indirectly by, for instance, cooling water. Other media to cool the belt indirectly are, for instance, air and other liquids. The droplets solidify on the belt and are removed as urea-comprising particles from the belt after solidification. The urea-comprising particles are normally removed from the belt by scraping, but other ways known to the man skilled in the art to remove the particles can also be used.

The urea-comprising liquid leaves the feeding device, normally, with a temperature above the melting point of urea. The melting point of urea is a temperature of 135° C. Normally, the urea-comprising liquid leaves the feeding device at a temperature of 135-140° C. On the belt the droplets are cooled and solidified to a temperature of $\leq 55°$ C. Thereafter the urea-comprising particles are removed from the belt. At a temperature of more than 55° C. the urea-comprising particles are not solid enough to handle. The particles break easily and dust will be present in the final product. The presence of dust promotes caking of the particles during shipment and storage.

The temperature of the particles can be influenced by the speed of the belt, the length of the belt and by the temperature and amount of the cooling medium.

For easy removal of the urea-comprising particles from the belt a release agent can be applied to the belt after removal of the solidified particles from the belt and before the droplets are dosed to the belt. It can also be necessary to clean the belt from remains of the urea-comprising particles. This can, for instance, be done by scraping off the remains of the particles after wetting.

The urea-comprising particles that are obtained are not spherical, such as the particles resulting from prilling and granulation, but are flat at the side of the particle that contacts the belt. The particles have a height/diameter ratio (h/d ratio) of 0.99 to 0.1. The 'diameter of the particle' is the diameter of the flat side of the particle. Preferably, particles with a h/d ratio between 0.7 and 0.3 are formed. This because of a higher bulk density and a lower chance of caking of the particles during transport.

The urea-comprising liquid can be defined as any liquid comprising urea in a dissolved, dispersed or liquid form. The liquid can thus be a urea-comprising solution, a urea-comprising slurry or a urea-comprising melt.

Preferably, the urea-comprising liquid is a urea melt. More preferably the urea melt comprises $\geq 99$ wt. % urea and most preferably $\geq 99.7$ wt. % urea.

A urea-comprising solution can also comprise other substances or be a mixture of urea with one or more other substances. The amount of urea in the urea-comprising liquid is preferably between 20 and 100 wt. %.

The urea-comprising liquid can contain an additive. Because the particles obtained in the pelletizer have a uniform composition each particle contains the same amount of additive.

It is an advantage of the process according to the invention that the additives can be mixed with the urea-comprising liquid before the pelletizer, whereafter the additives are evenly distributed in the particle.

Examples of additives are, for instance, formaldehyde and urea-formaldehyde reaction products, micronutrients and nitrification and urease inhibitors. Formaldehyde solutions can be added as such or formaldehyde can be reacted with urea to form a reaction product of urea and formaldehyde.

Examples of micronutrients are boron, manganese, iron, zinc, copper and molybdenum. The micronutrients can be present in the urea-comprising liquid as salts, (sulphates, chloride, nitrates), as oxides or as very small metal particles (flour). Examples of nitrification inhibitors are, for instance, pyridines, dicyandiamide and pyrazoles. Examples of urease inhibitors are, for instance, phosphoric triamides and ammonium thiosulphate.

The urea-comprising liquid can also comprise another fertilizer. Examples of other fertilizers are, for instance, ammonium sulphate and various phosphates, like monoammonium phosphate, diammonium phosphate and nitrophosphate.

An advantage of the use of a pelletizer is that slurries with a high amount of solid can still be pelletized. Such slurries can not easily be sprayed in a prilling tower or a granulator.

Ammonium sulphate is, up to an amount of 30 wt. % soluble in urea and liquids containing such an amount of ammonium sulphate can be prilled or granulated. A higher amount of ammonium sulphate will be present as a solid in the mixture. The mixture will then be a slurry.

A urea/ammonium sulphate mixture with >30 wt. % of ammonium sulphate, can be pelletized with the process according to the invention, but can not easily be sprayed in a prilling tower or a granulator.

The urea-comprising particles that are obtained can be coated after leaving the pelletizer. Coating means applying to the particle a thin layer to reduce the caking tendency. Examples of coatings are fine, inert powders, wax, oil and polymers. Examples of fine, inert powders are kieselguhr, talcum, lime kaolin and sulfur. Examples of wax are polyethylene waxes, parafins, fatty amines and sulfonates. Examples of polymer coatings are poly(vinylidene chloride) (PVDC) coatings, polyolefins (polyethylene, polypropylene and ethylene copolymers), polyurethane, urea-formaldehyde resins, polyesters and alkyd resins.

The obtained urea-comprising particles can be used as a fertilizer. To this end the urea-comprising particles according to the invention can be used as such or be mixed with other fertilizer particles with about the same shape and size to be spread together over the field in one fertilizer spreading apparatus.

EXAMPLES

Determination of the Crushing Strength

The crushing strength was determined with the apparatus LRX+ Material Testing Systems of Lloyd Instruments.

With a pair of tweezers a particle of the sample was placed in the centre of the pressing table of the crushing tester. The particle was placed in such a way that the flat side of the particle is the side on which the pressure was enforced.

The particle was subjected to a force, which is increased at a constant rate. The force applied at the moment at which the particle was crushed is determined and is the crushing strength of the particle.

The crushing strength was determined in Newton (N).

Example I

In a Rotoform apparatus of Sandvik Process Systems a urea melt was pelletized. The Rotoform apparatus had a belt width of 600 mm and a cooling length of 11 m.

The urea melt with a urea content of 99.8 wt. % was fed to the feeding device of the pelletizer. The urea melt was dosed to the belt with a temperature of 137° C. The belt was rotating with a speed of about 50 m/min. The belt was cooled with cooling water with a temperature of about 22° C. and with a flow of 6.5-9 $m^3/h$.

The urea pellets that were formed were scraped off at the turning point of the belt. The urea pellets had a temperature of 32-38° C., a diameter of 3.15-4.00 mm and a height of 2.0 mm. The crushing strength of the pellets was 15 N.

Example II

With the urea pellets obtained according to Example I a spreading test was performed. The urea pellets were fed to a fertilizer spreading apparatus, type ZA-M Maxi S 1500 of Amazone. A working width of 24 m could be realized.

Comparative Experiment A

In a Rotoform apparatus of Sandvik Process Systems a urea melt was pelletized. The Rotoform apparatus had a belt width of 600 mm and a cooling length of 11 m. The urea melt with a urea content of 99.8 wt. % was fed to the feeding device of the pelletizer. The urea melt was dosed to the belt with a temperature of 150° C. The belt was rotating with a speed of about 90 m/min. The belt was cooled with cooling water with a temperature of about 22° C. and with a flow of 8.5-10 $m^3/h$.

The urea pellets that were formed were scraped off at the turning point of the belt. The urea pellets had a temperature of 56-59° C., a diameter of 3.5-5.4 mm and a height of 1.9 mm. The urea pellets could be removed from the belt, but there was a lot of dust formed during removal of the pellets from the belt. The pellets showed caking after storage.

The invention claimed is:

1. Process for the production of urea-comprising particles, comprising:
   (a) providing a pelletizer which comprises a feeding device, a belt and a removal device to remove formed pellets from the belt,
   (b) feeding a urea-comprising liquid to the feeding device and causing droplets of the urea-comprising liquid to be discharged from the feeding device and dosed onto the belt,
   (c) solidifying the urea-comprising liquid droplets dosed onto the belt by cooling the droplets on the belt to a temperature of $\leq 55°$ C. to thereby form solid urea-comprising particles therefrom, and
   (d) removing the formed solid urea-comprising particles from the belt by means of the removal device.

2. Process according to claim 1, wherein the urea-comprising liquid is a urea melt.

3. Process according to claim 2, wherein the urea melt comprises $\geq 99$ wt. % urea.

4. Process according to claim 1, further comprising cleaning the belt after removing the urea-comprising particles from the belt according to step (d).

5. Process according to claim 1, wherein the urea-comprising liquid contains an additive.

6. Process according to claim 5, wherein the additive is a formaldehyde solution or a reaction product of urea and formaldehyde.

7. Process according to claim 1, wherein the urea-comprising liquid is a mixture of urea with another fertilizer.

8. Process according to claim 7, wherein the urea-comprising liquid is a mixture of urea with ammonium sulphate.

9. Process according to claim 8, wherein the urea-comprising liquid is a mixture of urea with >30 wt. % ammonium sulphate.

* * * * *